United States Patent [19]

Schiffleger

[11] Patent Number: 5,202,970
[45] Date of Patent: * Apr. 13, 1993

[54] METHOD FOR SHARING MEMORY IN A MULTIPROCESSOR SYSTEM

[75] Inventor: Alan J. Schiffleger, Chippewa Falls, Wis.

[73] Assignee: Cray Research, Inc., Eagan, Minn.

[*] Notice: The portion of the term of this patent subsequent to Aug. 25, 2009 has been disclaimed.

[21] Appl. No.: 834,867

[22] Filed: Feb. 13, 1992

Related U.S. Application Data

[60] Division of Ser. No. 682,876, Apr. 8, 1991, Pat. No. 5,142,638, which is a continuation of Ser. No. 307,882, Feb. 7, 1989, abandoned.

[51] Int. Cl.$^5$ .............................................. G06F 13/18
[52] U.S. Cl. .......................... 395/425; 364/DIG. 1;
364/228.1; 364/228.3; 364/242.7; 364/242.8;
364/242.9; 364/242.91; 364/244.8; 364/254.4
[58] Field of Search ................. 395/425; 364/DIG. 1, 364/DIG. 2

[56] References Cited

U.S. PATENT DOCUMENTS

| | | | |
|---|---|---|---|
| 3,337,854 | 8/1967 | Cray et al. | 340/172.5 |
| 3,346,851 | 10/1967 | Thornton et al. | 340/172.5 |
| 4,096,571 | 6/1978 | Vander Mey | 364/200 |
| 4,128,880 | 12/1978 | Cray, Jr. | 364/200 |
| 4,280,176 | 7/1981 | Tan | 364/200 |
| 4,380,798 | 4/1983 | Shannon et al. | 364/200 |
| 4,392,200 | 7/1983 | Arulpragasam et al. | 364/200 |
| 4,400,771 | 8/1983 | Suzuki et al. | 364/200 |
| 4,402,046 | 8/1983 | Cox et al. | 364/200 |
| 4,442,487 | 4/1984 | Fletcher et al. | 364/200 |
| 4,462,073 | 7/1984 | Grondalski | 364/200 |
| 4,509,140 | 4/1985 | Cheung | 364/900 |
| 4,630,230 | 12/1986 | Sundet | 364/900 |
| 4,633,434 | 12/1986 | Scheuneman | 364/900 |
| 4,636,942 | 1/1987 | Chen et al. | 364/200 |
| 4,661,900 | 4/1987 | Chen et al. | 364/200 |
| 4,745,545 | 5/1988 | Schiffleger | 364/200 |
| 4,754,398 | 6/1988 | Pribnow | 364/200 |
| 4,766,535 | 8/1988 | Auerbach et al. | 364/200 |
| 4,901,230 | 2/1990 | Chen et al. | 364/200 |
| 5,142,638 | 8/1992 | Schiffleger | 395/425 |

FOREIGN PATENT DOCUMENTS

| | | |
|---|---|---|
| 1218754 | 3/1987 | Canada . |
| 1228675 | 10/1987 | Canada . |
| 1242284 | 9/1988 | Canada . |
| 0123509 | 10/1984 | European Pat. Off. . |
| 3210816A1 | 10/1982 | Fed. Rep. of Germany . |

OTHER PUBLICATIONS

"The Parallel and the Pipeline Computers" by William R. Graham, *Datamation*, pp. 68–71, Apr. 1970.
"Computer Systems Architecture" by Jean-Loup Baer, Computer Science Press, Inc., pp. 508–561, 1980.
"Shared Memories in the CYBA-M Multimicroprocessor" by E. L. Dagless; M. D. Edwards; and J. T. Proudfoot, *IEE Proceedings*, vol. 130, No. 4, pp. 116–124, Jul. 1983.

*Primary Examiner*—David L. Clark
*Assistant Examiner*—Matthew C. Fagan
*Attorney, Agent, or Firm*—Merchant, Gould, Smith, Edell, Welter, & Schmidt

[57] ABSTRACT

A method of memory access for sharing a memory between multiple processors. The memory comprises a plurality of sections and each section is connected to each processor by a memory path. Each section includes a plurality of subsections and each subsection includes a plurality of banks which includes a plurality of individually addressable memory locations. Memory references attempting to access the individually addressable memory locations are generated by the processors. Subsection conflicts between the memory references generated by a plurality of ports of each processor are resolved so that only one of the memory references from each processor is allowed to access one of the plurality of subsections at a time. Section conflicts between the memory references generated by the plurality of ports of each processor are resolved so that only one of the plurality of ports of each processor connects by the memory path for each processor to one of the plurality of the sections at a time. Bank conflicts between particular memory references which are allowed access to one of the plurality of subsections in one of the plurality of sections are resolved so that only one memory reference accesses a particular bank in one of the plurality of subsections at a time.

12 Claims, 6 Drawing Sheets

METHOD FOR SHARING MEMORY IN A MULTIPROCESSOR SYSTEM

This is a divisional application of Ser. No. 07/682,876, filed Apr. 8, 1991, now U.S. Pat. No. 5,142,638, which is a continuation application of Ser. No. 07/307,882, filed Feb. 7, 1989, now abandoned.

TECHNICAL FIELD OF THE INVENTION

The present invention pertains generally to the field of multiprocessor computer systems and more particularly to method for sharing a memory system between multiple processors.

BACKGROUND OF THE INVENTION

In many cases the data processing speed of a computer system can be greatly enhanced by providing one or more additional processors to form a multiprocessor system in which a common or central RAM memory is shared. However, the sharing of resources, particularly the memory, results in conflicts between the processors' various memory reference requests, such that if the memory and the memory access control logic is not properly designed much of the potential increase in efficiency and economy of the system can be lost to access delays.

Minimizing conflicts and delays in accessing a shared memory is typically accomplished in two different but cooperative ways. One way is to segment the shared memory into many independently addressable banks such that each reference to a bank ties up a relatively small percentage of the memory, leaving the rest of the memory accessible. This approach, however, entails an increase in the complexity and thus size and cost of the memory, and can also impose limitations on the speed at which each reference may be accomplished.

The other approach to minimizing memory reference delays involves the interface between each processor and the available memory access paths, and the treatment of conflicting requests to memory either between individual ports in a processor or between different processors. As may be readily appreciated, this approach must be cooperative with the former approach as the design of the interface must correspond to the number of independent access paths between the memory and the processors.

Ideally, the memory interface should provide for maximum utilization of the available memory access paths and that each processor has substantially equal accessibility to the memory at most times, particularly where there is no master-salve relationship between the processors. In addition, it is desireable that memory conflict be resolved in as few systems clock periods as possible so that reference start up time and data buffering requirements are held to a minimum. The attainment of these goals is, however, restrained by the cost and particularly the quantity of logic which may be employed. In particular, in the case of high-speed vector processing machines there are tight restrictions on the space which may be allotted to interface circuits due to the necessity to bring all processors into close proximity to the memory in order that propagation delays be minimized. In addition, it is desireable that wiring requirements be held down.

As is well appreciated by those skilled in the art, attaining an efficient, economical and workable memory interface becomes increasingly difficult as the number or processors is increased. Those designs which may be quite efficient in a dual or 4 processor system may be totally unsuitable for systems with more processors because of the increases in logic which are needed to adapt such schemes to a larger number of processors, and the additional demands made on the memory by the additional processors. Moreover, increasing the number of processors typically increases the nominal distance between a given processor and the memory, increasing signal propagation delay and placing further restraints on the number of logic levels which may be employed.

Accordingly, it is readily seen that the system used to share memory in a multiprocessor system is crucial to its efficiency. Moreover, it is readily seen that there are not only a large number of constraints on the design of such systems but in addition that these constraints often work against one another to represent a difficult design challenge.

SUMMARY OF THE INVENTION

The present invention provides a method of memory access for sharing a memory between multiple processors. Each processor has a number of ports for generating memory references. The memory comprises a plurality of sections and each section is connected to each processor by a memory path. Each section includes a plurality of subsections and each subsection includes a plurality of banks. Each bank includes a plurality of individually addressable memory locations. A plurality of memory references attempting to access individually addressable memory locations of the bands within said subsections are generated. Subsection conflicts between the memory references generated by the plurality of ports of each processor are resolved so that only one of the memory references from each processor is allowed to access one of the plurality of subsections at a time. Section conflicts between the memory references generated by the plurality of ports of each processor and which are allowed access to one of the plurality of subsections are resolved so that only one of the plurality of ports of each processor connects by the memory path for each processor to one of the plurality of the sections at a time. Bank conflicts between particular memory references generated by the plurality of processors and which are allowed access to one of the plurality of subsections in one of the plurality of sections are resolved so that only one of the particular memory references accesses a particular bank in one of the plurality of subsections at a time.

According to another aspect of the method, a plurality of memory references from at least one port of each processor is allowed access to the shared memory in a non-sequential order. The results of the plurality of memory references accessing the shared memory are returned to the port in sequential order.

DETAILED DESCRIPTION OF THE INVENTION

Figure 1:
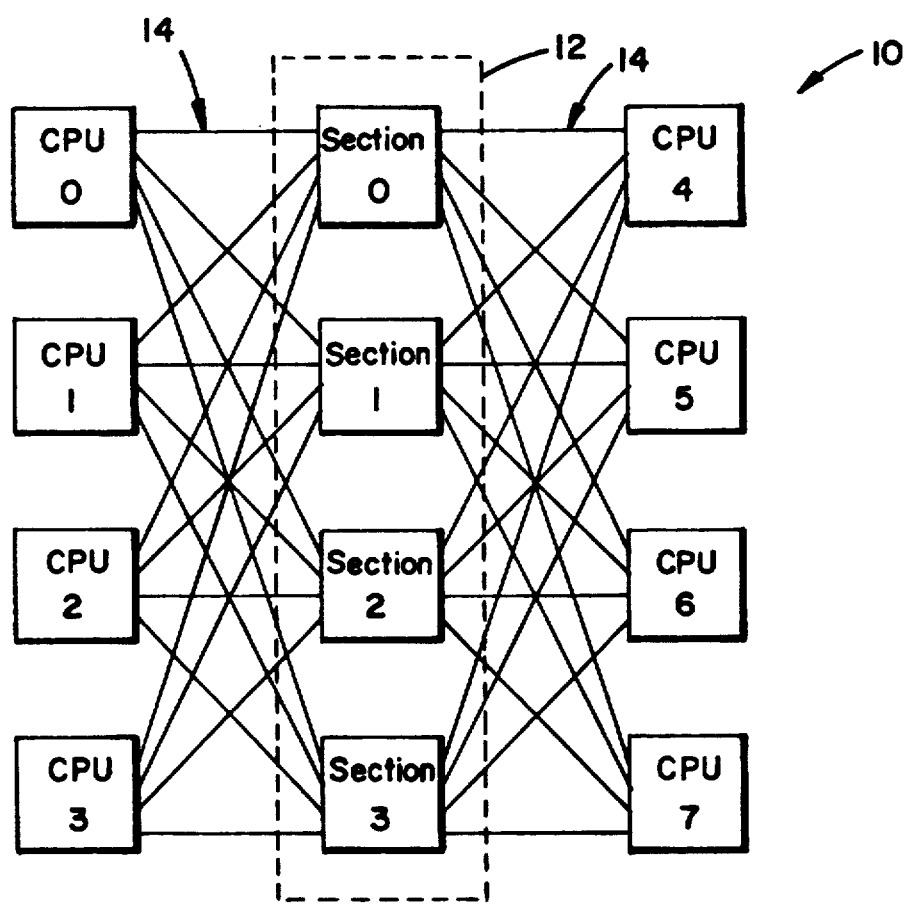
FIG. 1 is a simplified block diagram of the connection of the CPUs to the memory according to the present invention.

The present invention relates to a system for interfacing a plurality of CPUs to a central or shared memory. In particular, the invention is tailored for a multiprocessor system in which each processor is capable of generating memory references from several independent ports each of which may operate substantially independently of the CPU to carry out data and instruction transfers. An example of a CPU of the type of which the present invention is adapted to interface to a memory is shown in U.S. Pat. No. 4,661,900 to Chen et al., entitled "FLEXIBLE CHAINING IN A VECTOR PROCESSOR". As shown in FIG. 1, the present invention is specifically designed for a multiprocesor system 10 having eight CPU's. It shall be understood, however, that the principles of the invention can be applied to multiprocessor systems having a greater or lesser number of CPUs.

Memory 12 of system 10 is organized into four sections. Each of the CPUs is connected to each of these sections through a memory path 14. Each path 14 consists of the following:

| 72 Bits | Write Data |
| 20 Bits | Address (32 million word memory option) |
| 8 Bits | Go Sub-section |
| 1 Bit | Write Reference |
| 1 Bit | Abort Reference (Address Range Error) |
| 72 Bits | Read Data |
| 3 Bits | Sub-section Read Select |

Each address is configured as follows:

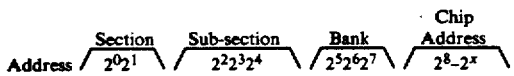

The 72 bits of Write Data of path 14 comprise the data to be written from a CPU to the memory. The eight Go Sub-Section signals indicate which of the eight Sub-Sections within each memory section the reference is to. As indicated above, the section to which a reference is directed is controlled by the first two bits of the address. These two bits determine which of the paths 14 the reference will use to access the proper section of memory. As will be described below, internal to each CPU represented in FIG. 1 are a plurality of reference generating ports, any one of which can be connected to any one of the four paths 14 between each CPU and the respective sections of memory 12. The Write Reference signal on path 14 indicates whether the reference is a write or a read reference. The Abort Reference signal is also provided, and provides that a reference may be aborted if an address range error is detected by range checking circuits in the CPU's memory reference generation circuits (not shown). The seventy-two bits of read data are provided on each path 14 carry data from the memory to the CPU. Finally, three bits of Sub-section Read Select Data is also provided Further information on the organization of memory 12 will be provided below.

Figure 2:
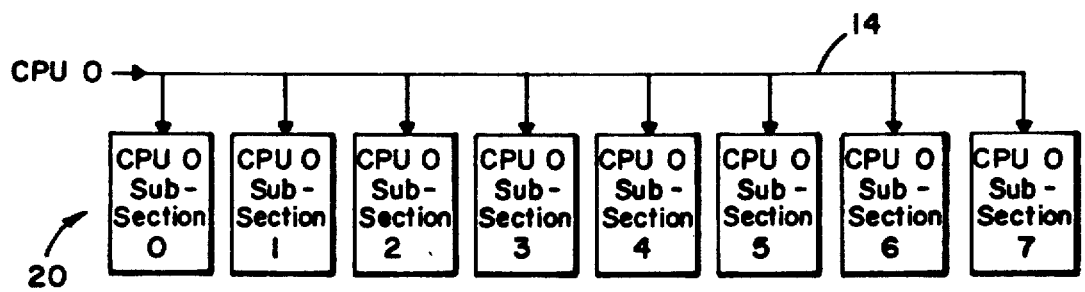
FIG. 2 is a simplified block diagram showing connection of one CPU to each of the sub-sections of a section of memory.

The system 10 as generally outlined above thereby provides that one read or write reference can be made every clock period on each path 14. Therefore, the system memory is capable of 32 references per clock period. FIG. 2 shows that each section of memory is organized into eight sub-sections (0–7) 20. Each CPU is connected to each one of the sub-sections 20 via one of paths 14, each of which is connected in parallel to each of the sub-sections.

Figure 3:
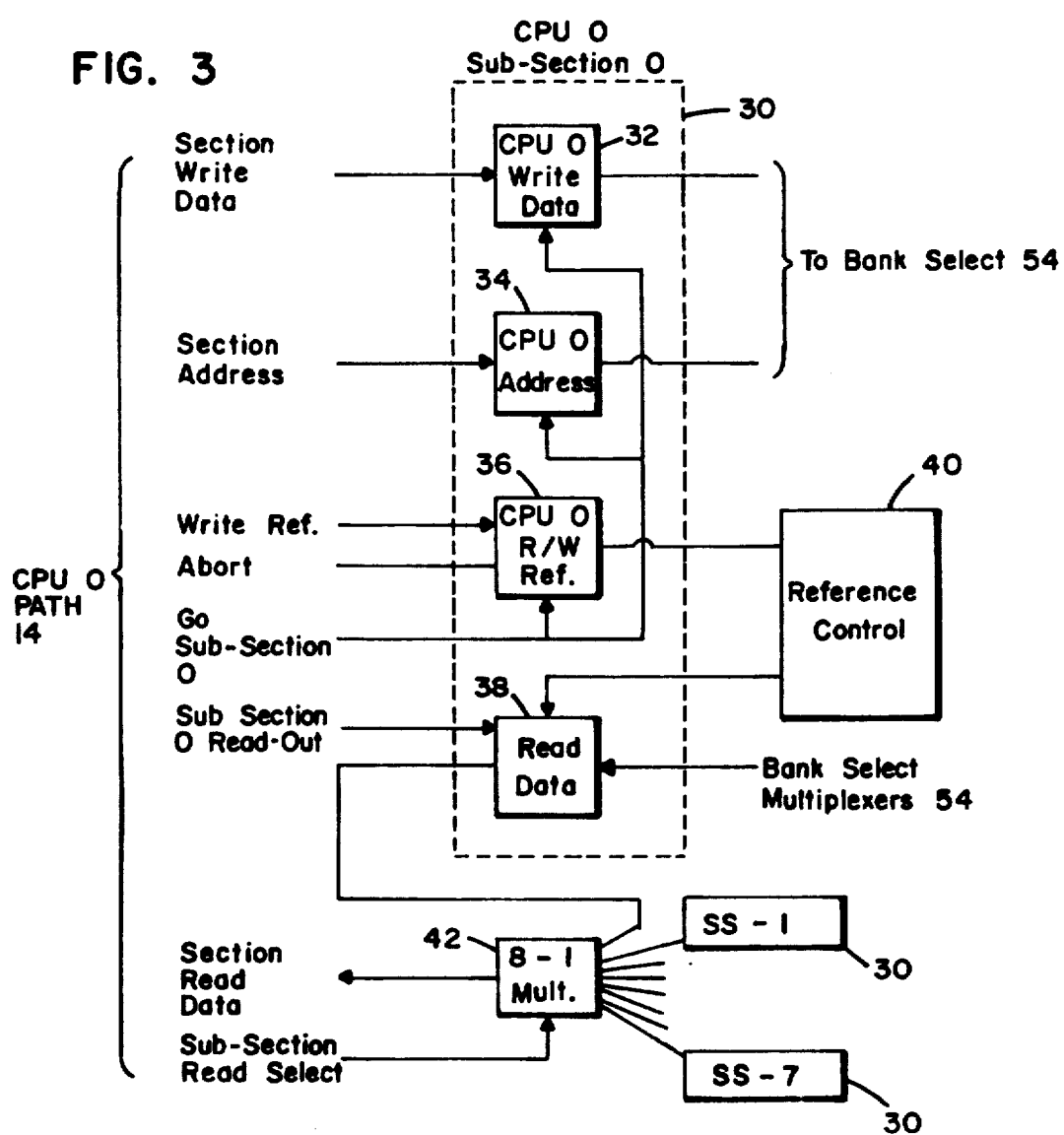
FIG. 3 is a simplified block diagram showing the connection of one CPU to one of the sub-sections in greater detail.

FIG. 3 shows in more detail how each path 14 is connected to each of the sub-sections 20, using the example of the connection of CPU 0 to sub-section 0 of one of the memory sections. Input logic 30 includes a first latch 32 to receive the 72 bits of Write Data from connection 14. A latch 34 receives the Section Address from connection 14. A latch 36 receives as input the Write Reference signal and the Abort Reference signal.

Each of latches 32, 34, and 36 are clocked by the Go Sub-Section 0 signal. As mentioned above, this Go Sub-Section Section 0 signal is one bit of the 8 Go Sub-Section bits carried on connection 14 and indicates which sub-section within a section of memory the reference carried on a path 14 is directed to. When latches 32 and 34 are clocked the Write Data and Section Address are passed through to the bank select circuits 54 to be described below. In addition, the Write Reference signal from latch 36 is passed to the reference control circuits 40, which control the generation of the signals necessary to actually reference the memory at the chip level, which can be carried out in a conventional fashion. Reference control 40 is connected to control read data latch 38 which receives Read Data coming out of the memory. Latch 38 is connected to an 8-to-1 multiplexer 42 which selects between the read data latches for each of the circuits 30 used in one of the sections. The Read Data selected by multiplexer 42 is passed back along path 14. The multiplexer selection in multiplexer 42 is controlled by the three bits of sub-section Read Select Data carried on the path 14. The operation of this aspect of the invention will be described in more detail below.

Figure 4:
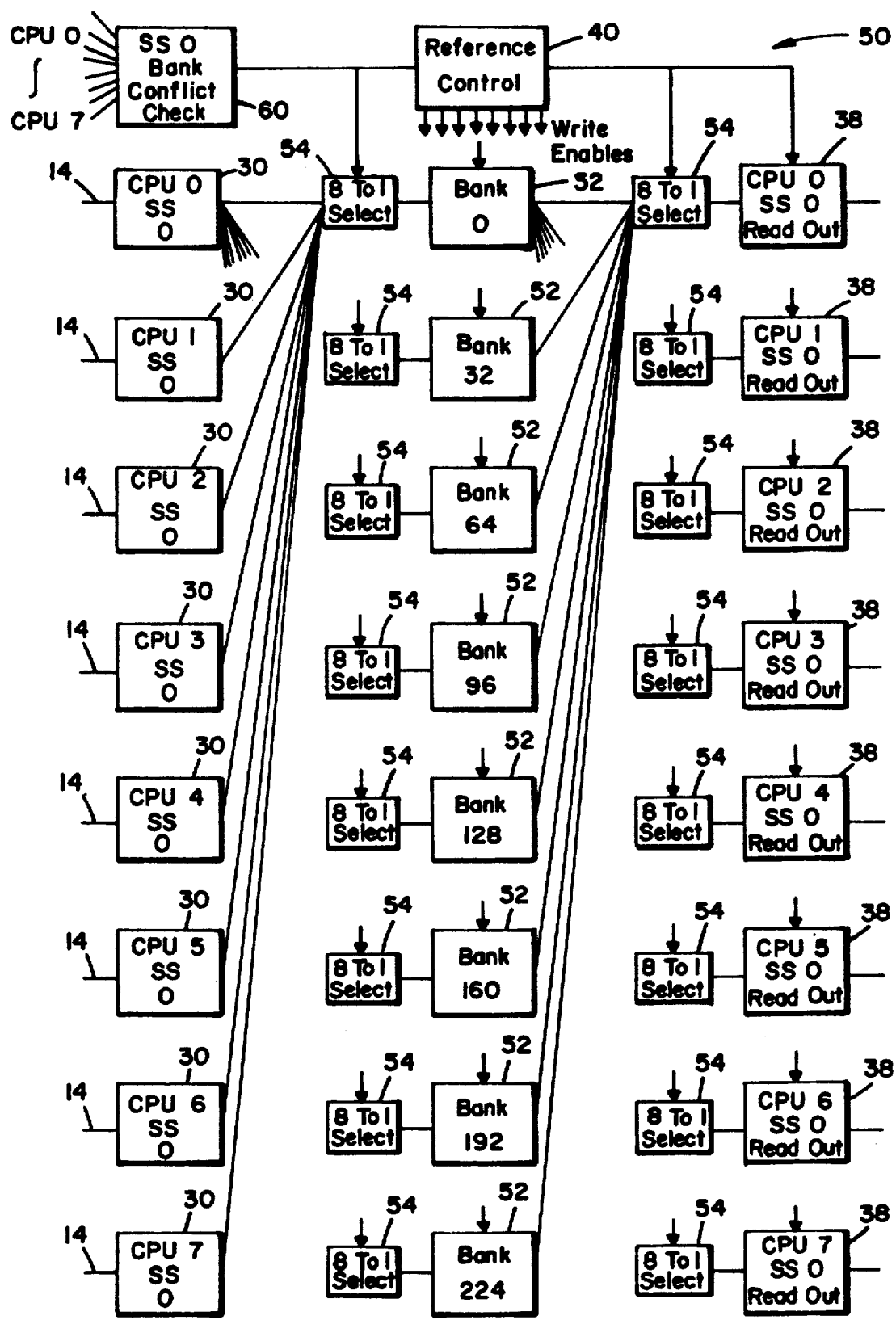
FIG. 4 is a simplified block diagram of the basic structure of each of the sub-sections of memory.

Referring now to FIG. 4, there is shown a simplified block diagram of one sub-section 20 of memory 12. Each of the sub-sections includes eight banks of memory organized in a interleaved fashion. For instance, the sub-section 0 illustrated in FIG. 4 includes banks 0, 32, 64, 96, 128, 160, 192 and 224. The banks are similarly interleaved among the other sub-sections such that sub-section section 0 of memory section 1 would include banks 1, 33, 65, 97, 129, 161, 193 and 225 and so on for each successive sub-section of memory progressing from section 0 to section 3. Accordingly, memory 12 includes a total of 256 banks of memory.

Each of the banks 52 of memory contains a number of individually addressable memory locations each with its own unique address. Each bank may function independently of the others and can be referenced individually and/or simultaneously with another bank within the same sub-section. However, although different banks may be accessed or referenced simultaneously, the present invention contemplates that no one bank may be referenced more than once every five system clock cycles, due to the recovery time of the memory. The memory is preferably constructed with 64K×1 ECL chips available from Fujitsu Electronics of Japan and its U.S. agents.

FIG. 4 shows that each of circuits 30 (as illustrated in FIG. 3) for each of CPUs 0–7 are connected to each of the bank select multiplexers 54, whereby each CPU may access any one of the eight banks 52 within the sub-section. Bank select multiplexers 54 further provide connections for the Read Data outputs of banks 52 to read out registers 38 of circuit 30, one of which is provided for each of the CPUs.

Thus, as outlined above, there is provided a memory access system wherein a CPU may generate a reference to any one of the four sections of memory and any one of the sub-sections and banks within each one of these sections. Since more than one CPU may request a reference to the same bank within any one of the sub-sections, there is provided bank conflict checking circuits 60 in each sub-section to detect and arbitrate these conflicts. Conflict checking circuits 60 are shown generally in FIG. 4 and in more detail in FIG. 6. As shown in FIG. 4, conflict checking circuit 60 is interfaced with reference control circuit 40, the multiplexers 54 and the read out register 30 wherein references to the banks within each sub-section are controlled.

Figure 5:
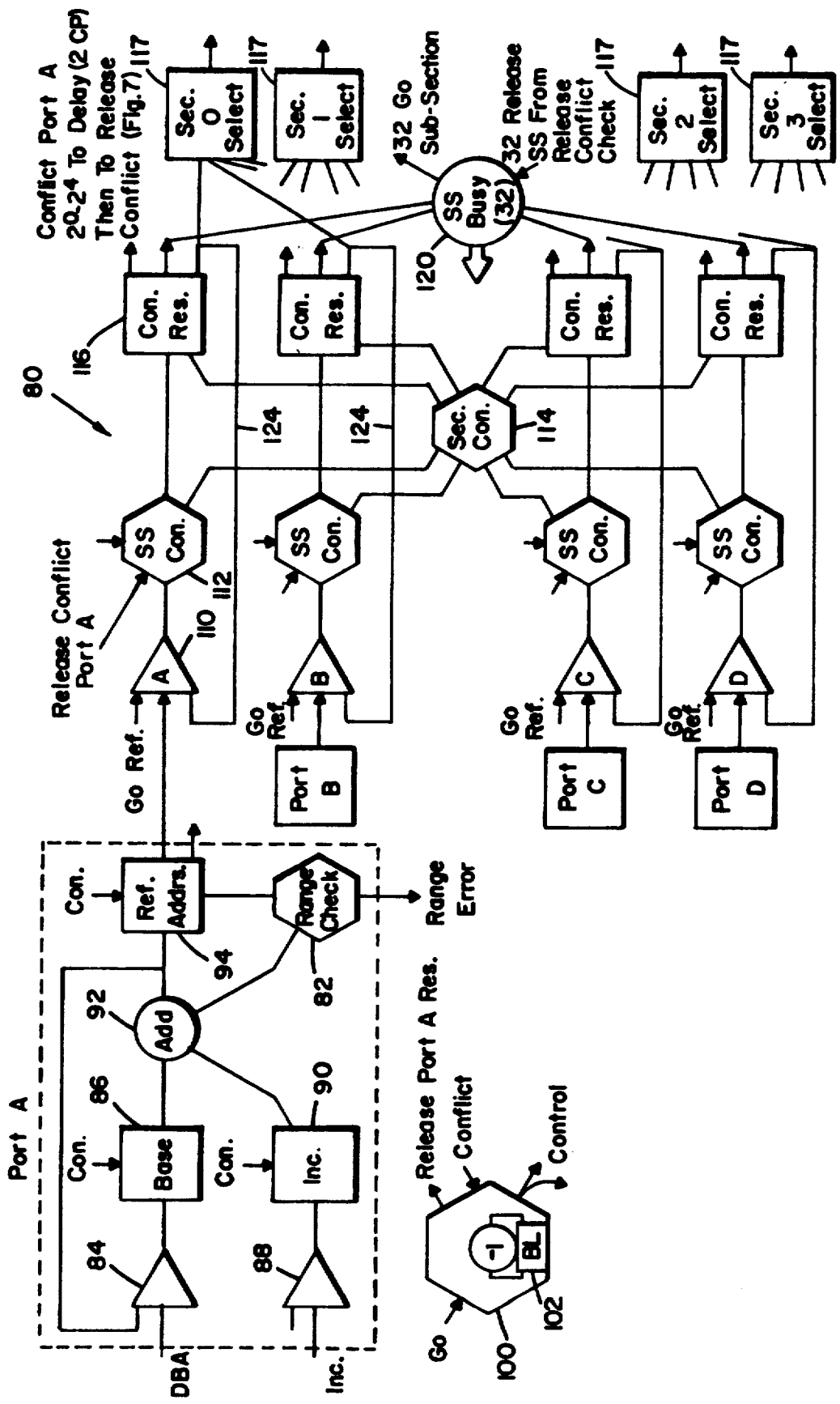
FIG. 5 is a simplified block diagram of a sub-section conflict resolution circuit as provided for each CPU in the system.

Referring now to FIG. 5 there is shown in simplified block diagram a sub-section conflict circuit 80. Each CPU includes one circuit 80 to control the references generated by the reference generating circuits (82) of the CPU. Each memory reference generation circuit, or "port", includes, for instance, an input gate 84 and register 86 for receiving and holding a base address. A gate 88 and register 90 may be provided to receive and hold an address increment. An add circuit 92 is provided to add the base address 86 to the increment 90, submit it to the reference address register and return it to gate 84 to be resubmitted to base address register 86. As shown in control circuit 100, there is preferably provided a block length register 102 which is initially loaded with the length of the intended reference and which is decremented once after each reference until the register zeros out indicating that the reference has been completed. Reference address register 94 passes the first 5 bits $2^0$–$2^4$ of the memory reference address to the corresponding one of gates 110, one of which is provided for each of memory reference generating circuits 82. The output of gates 110 are connected to one of sub-section conflict detection circuits 112, each of which are in turn connected to a section conflict detection circuit 114. Sub-section conflict detection circuits 112 and section conflict circuit 114 permits circuit 80 to detect if a reference generated by the CPU is directed to a sub-section within memory 12 which is currently busy processing a reference previously generated by the same or a different port within the CPU. If such is the case, circuits 112 generate a sub-section conflict signal to the corresponding one of conflict resolution circuits 116. Similarly, attempts by more than one port to access the same section of memory at the same time are detected by section conflict checking circuit 114, which provides an output to each of conflict resolution circuits 116. As noted above, since there is only one input circuit 30 for each CPU in each sub-section of memory no more than one reference to that input circuit at any time can be permitted from a CPU. Similarly, since there is only one path from each CPU to each section of memory only one reference per section of memory can be permitted from each CPU. Accordingly, conflict resolution circuits 116 provide that these conditions are met.

To this end, conflict resolution circuits 116 provide that each reference generated from a port in the CPU is first checked to see whether or not it is attempting to access a busy sub-section, as tracked by sub-section busy circuit 120. Sub-section busy circuit 120 receives an input from each of conflict resolution circuits 116 so that it can keep track of which of the sub-sections are busy. If a sub-section is busy, the sub-section identifying bits of the address $2^0$–$2^4$ are resubmitted to the gate 110 over connections 124, and reconsidered in this fashion until allowed to proceed. Likewise, references which have a section conflict are also resubmitted. If a reference is permitted to proceed, the address bits $2^0$–$2^4$ are forwarded through a two CP delay circuit (not shown) along to the release conflicts 146–149 of FIG. 7.

Section conflict checking circuit 114 checks for and prioritizes attempts to access the same section of memory simultaneously. If more than one reference has a simultaneous reference conflict without a sub-section busy conflict, the conflict is resolved as follows. First, if the references each have the same increment (i.e. whether odd or even addressing increment) the first port to initiate the reference has priority. An odd address increment always has highest priority over an even increment. However, in the case of port D, where a reference is an I/O reference, the port always has lowest priority unless 32 consecutive conflicts occur, in which case the port is switched to highest priority. However, if port D is doing an instruction fetch, it is given the highest priority in all cases. Once a reference is allowed through the subsection conflict check, it is transmitted on path 14 to the bank conflict check of FIG. 6.

The output of conflict circuits 116 are fed to section select circuits 117, which select which port will access a given memory path 14, as controlled by the section conflict circuit 114 and the section to which the reference is directed as determined by the address.

Figure 6:
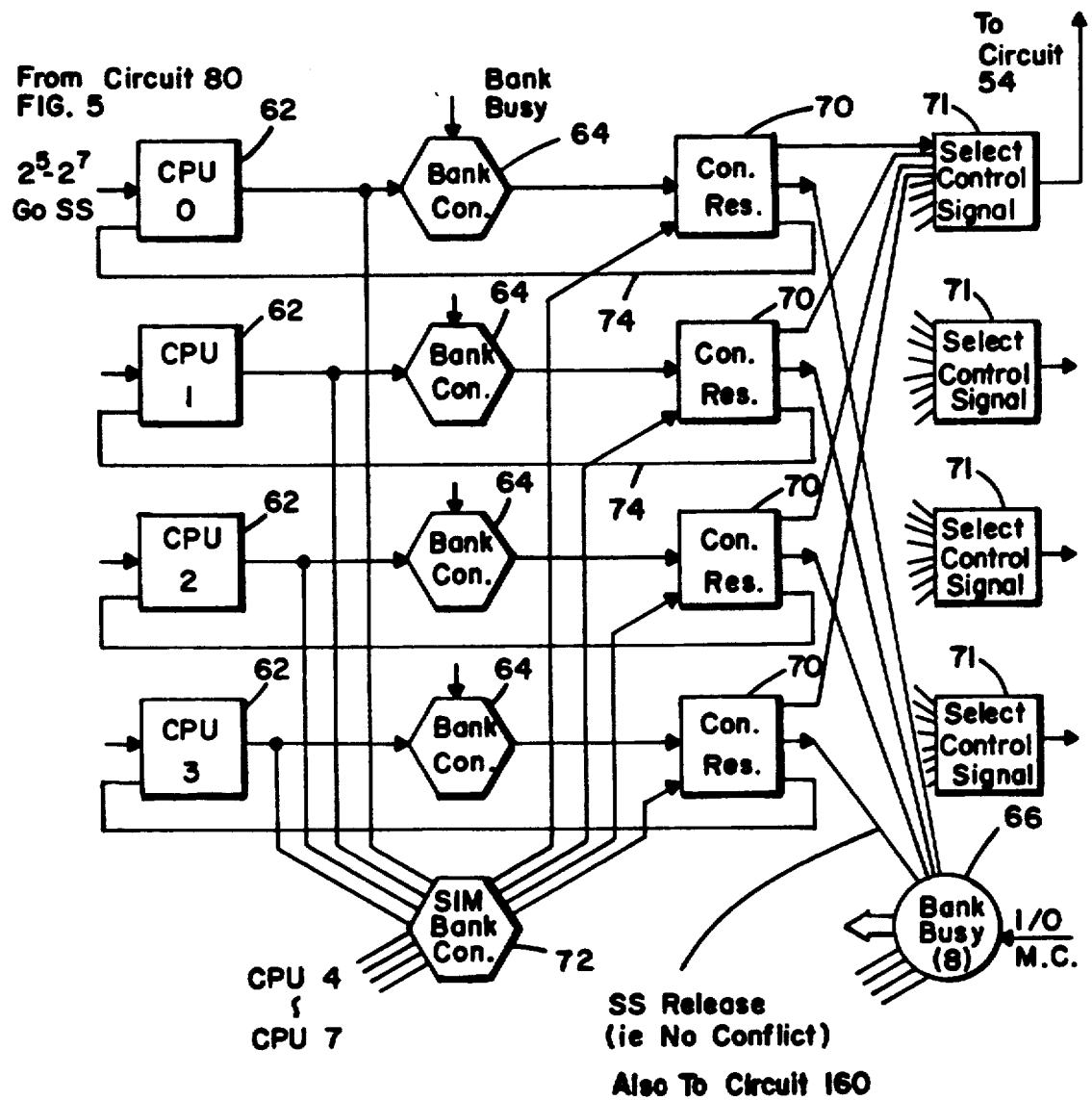
FIG. 6 is a simplified block diagram of a bank conflict resolution circuit as found in each sub-section of memory.

Referring now to FIG. 6, there is shown in block diagram form one of the bank conflict checking circuits for one of the sub-sections. Each of the bank conflict checking circuits 60 includes an input register 62 for each of the CPUs 0–7. Each of the register 62 receives the 3 bits of the address data ($2^5$–$2^7$) which specify the bank within the sub-section to which the reference is addressed. Bank conflict checking subcircuits 64 are provided to determine for each reference from a CPU whether or not the bank sought to be referenced is currently busy. For this purpose there is provided a bank busy circuit 66 which keeps track of which banks of the sub-section are currently busy making a reference. The output of bank busy circuit 66 is connected to each of bank conflict circuits 64 whereby each of them can determine whether or not a reference held in a register 62 has a conflict. If a conflict is detected, it is indicated to the corresponding conflict resolution circuit 70. Each of conflict resolution circuits 70 also receive an input signal from the simultaneous bank conflict resolution circuit 72, which identifies simultaneous attempts by two or more processors to access the same bank of memory on the same clock period.

If a conflict is detected by either a bank busy circuit 64 or simultaneous bank conflict checking circuit 72 the conflict resolution circuits 70 are called into play to resolve the conflict. A conflict is resolved either by holding a reference attempting to access a busy bank (banks are held busy for five clock periods), as in the case of a bank busy conflict, or by holding all but one of references attempting to access the same bank simultaneously on the same clock period.

If a simultaneous bank conflict is detected by circuit 72, conflict resolution circuits 70 determine which reference will proceed first. The priority of references is fixed for each sub-section according to which section and subsection is being referenced. From the predetermined CPU path, the memory control determines which CPU has the higher priority. As set forth in the table below, the priority is such that a CPU with a CPU A reference has the highest priority while a CPU with a letter CPU H would have the lowest priority. The table shows the CPUs letter reference.

| | | CPU TO MEMORY PRIORITY TABLE | | | | | | |
|---|---|---|---|---|---|---|---|---|
| Section | | 0 | | 1 | | 2 | | 3 |
| Subsection | 0 | 2 | 0 | 2 | 0 | 2 | 0 | 2 |
| | 1 | 3 | 1 | 3 | 1 | 3 | 1 | 3 |
| | 4 | 6 | 4 | 6 | 4 | 6 | 4 | 6 |
| | 5 | 7 | 5 | 7 | 5 | 7 | 5 | 7 |
| CPU | 0 | A | H | D | E | C | F | B | G |
| PATH | 1 | B | G | A | H | D | E | C | F |
| | 2 | C | F | B | G | A | H | D | E |
| | 3 | D | E | C | F | B | G | A | H |
| | 4 | H | A | E | D | F | C | G | B |
| | 5 | G | B | H | A | E | D | F | C |
| | 6 | F | C | G | B | H | A | E | D |
| | 7 | E | D | F | C | G | B | H | A |

For example, if CPU 3 went to Section 1, Subsection 5, its CPU letter reference would be CPU C when competing for any of the banks in Subsection 5. This means any reference from CPU A or CPU B for the same bank as CPU C wanted would cause CPU C to wait. As will be recognized by those skilled in the art, the priority system outlined above can be achieved with a single priority circuit design by merely changing the wiring of the CPU memory paths to subsection circuits.

If a reference is held, conflict resolution circuit 70 resubmits the reference to the originating input register 62 via signal path 74 so that the reference can be reconsidered on succeeding clock cycles. If no conflict is detected, a Sub-Section Release signal (SS Release) is generated by the conflict resolution circuit 70 corresponding to the originating register 62 to indicate that the reference being attempted can proceed. This Sub-Section Release signal is fed to the reference control circuit 40 (FIG. 4) to accomplish a memory reference in the banks. Conflict resolution circuits 70 generate an output signal fed to select control signal circuits 71, which generate the signals necessary to control multiplexers 54. Accordingly, it may be seen that no more than one reference can be issued to any bank within a sub-section at a time. Preferably it is desirable to physically locate the circuit of FIG. 6 close to or in the sub-section it handles.

Figure 7:
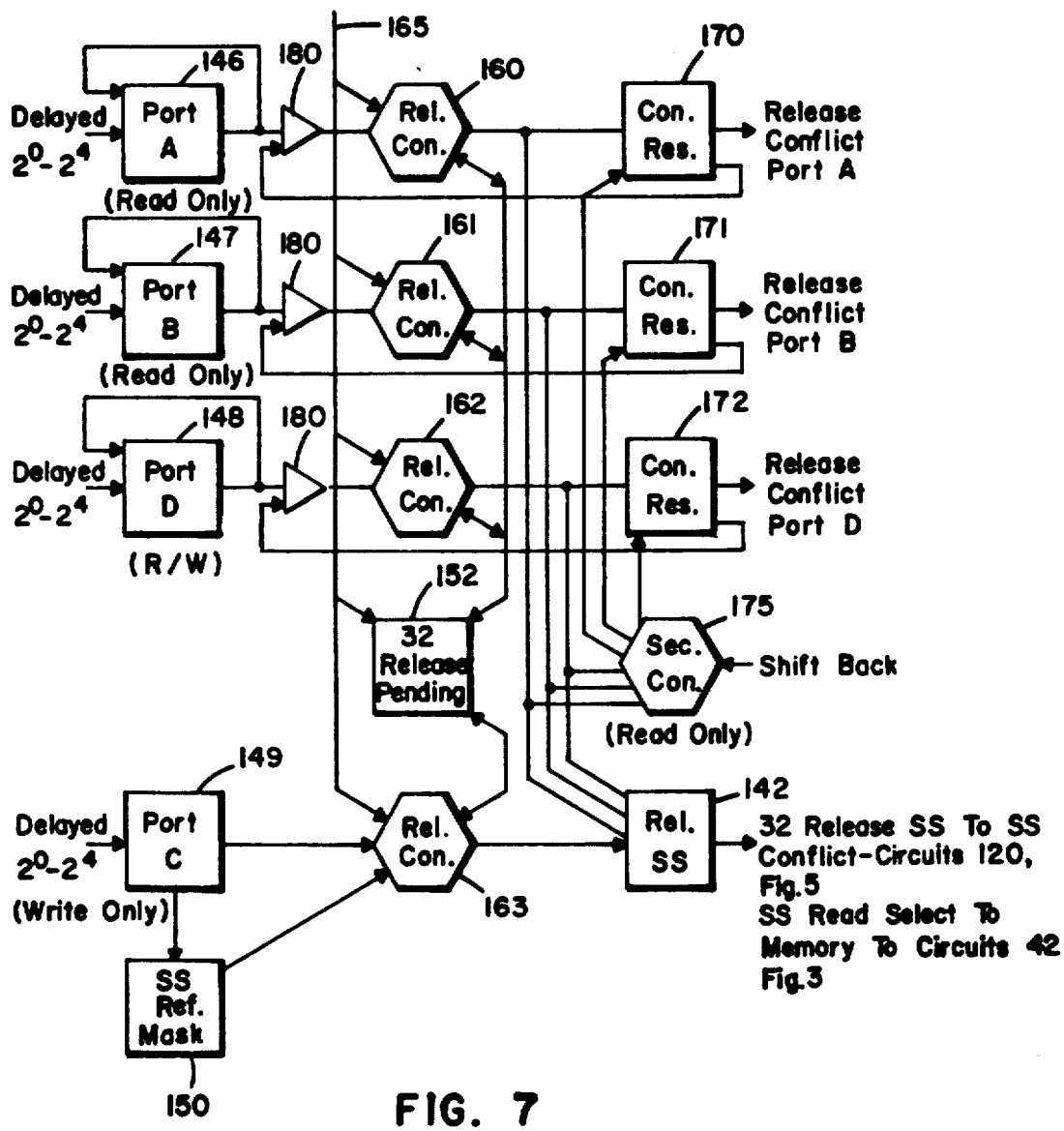
FIG. 7 is a simplified block diagram of the release conflict circuit provided for each CPU.

Referring now to FIG. 7, there is shown one of the release conflict circuits 140 of CPU's 0-7. A release conflict circuit 140 is provided for each CPU. Release conflict circuit 140 includes four input registers 146-149 each of which receive at their respective inputs memory address bits $2^0$-$2^4$ as generated from circuit 80 of FIG. 6. These address bits are delayed two clock periods from when they are generated from circuit 116 to when they are applied to circuits 146-149. This delay corresponds to the minimum amount of time required for a reference which is allowed by the sub-section conflict circuit to clear the bank conflict circuit in FIG. 6 if no conflict occurs. This 2 CP delay plus circuits 116, 146 and 170 matches the 5 CP bank busy reference cycle time.

Release conflict circuits 160-163 are provided and are connected to the respective outputs of circuits 146-150. Circuits 160-163 look for a subsection release signal to match a reference indicated in circuits 146-150. Circuits 160-163 can look to release pending reference register 152 or to sub-section release signals arriving on signal path 165.

The release pending reference logic 152, holds a copy of all subsection release signals, that were received on path 165, which did not match a reference in circuits 146-150. These sub-section release signals are held until a reference in 146-150 does match at which time corresponding pending release is cleared.

Circuits 160-162 are connected to conflict resolution circuits 170-172, respectively. If a reference arrives at a register 146-148 and does not match a corresponding SS release signal, circuits 170-172 generate a release conflict signal which is applied to circuit 80, which forces a conflict in conflict circuits 112 (FIG. 5), which in turn shuts down the corresponding port. This conflict also holds all references in the 2 CP delay circuit (not shown) and in the corresponding one of 146-148 and resubmits the reference in 170 through 180.

If a match occurs in more than one of circuits 160-162 for read references, then section conflict circuit 175 determines if those read references are to the same section. If more than one of those read references is to the same section, then all but one port will generate a release conflict at 170-172. The priority in A is highest if B and D did not have section conflicts the previous CP. B is highest if it had a section conflict the previous CP and D has not had 2 CP of section conflicts. D is highest if it has had 2 CP's of section conflict.

Circuit 150, port C sub-section reference mask, contains 32 latches corresponding to each of the 32 sub-sections. If a reference arrives at register 149 and does not match a corresponding SS release signal, the corresponding latch in 150 is set. Circuit 163 compares the SS release (165) and release pending (152) signals to the reference in 149 and to the reference mask 150.

The four references in a port "pipeline" (either A, B or D) can receive SS releases non-sequentially but then will be matched up with their corresponding release sequentially as each reference passes through 146-148 thus maintaining a sequential order for read references. Port C is write only and therefore no sequential order of completion is necessary. Therefore SS reference mask 150 is used instead of a release conflict to merely keep track of which references are pending. Release sub-section control circuit 142 produces a release sub-section signal to each one of the eight sub-sections within the four sections of memory, for a total of 32 release subsection signals. When a match between a reference and a release occurs in 160-163, the circuit 142 generates the appropriate release SS. These signals are applied to the sub-section checking circuit 120 (FIG. 5). These signals clear the subsection busy signal which is set by the CPU when the CPU makes a reference to the subsection, and signify that the reference has been checked by the bank conflict circuit and was allowed to proceed in the subsection. The CPU is thus permitted to issue another reference to the cleared subsection. Circuit 142 also generates the SS read select signals for each section for a read reference when the release SS is generated.

Although the invention has been described herein in its preferred form, those skilled in the art will readily recognize the various modifications and changes may be made thereto without departing from the spirit and scope of the claims appended hereto.

What is claimed:

1. A method of memory access for sharing a memory between a plurality of processors, each processor having a plurality of ports for generating memory references, said memory comprising a plurality of sections, each section connected to each processor by a memory path, each section including a plurality of subsections, each subsection including a plurality of banks, each bank including a plurality of individually addressable memory locations, said method comprising the steps of:

generating a plurality of memory references by said plurality of ports of said each processor attempting to access individually addressable memory locations of said banks within said subsections;

resolving subsection conflicts between said plurality of memory references generated by said plurality of ports of said each processor so that only one of the memory references from said each processor is allowed to proceed to attempt access to one of said plurality of subsections at a time;

resolving section conflicts between said plurality of memory references generated by said plurality of ports of said each processor and which are allowed to proceed to attempt access to said one of said plurality of subsections so that only one of the plurality of ports of said each processor connects via the memory path for said each processor to one of said plurality of sections at a time; and resolving bank conflicts between particular memory references generated by said plurality of processors and which are allowed access to said one of said plurality of subsections in said one of said plurality of sections so that only one of said particular memory references accesses a particular bank in said one of said plurality of subsections at a time.

2. A method according to claim 1, further comprising the steps of:

allowing a plurality of read memory references from at least one read port of said plurality of ports of said each processor to access the memory in a non-sequential order; and maintaining a sequential order for returning results of said plurality of read memory references accessing the memory to said at least one read port.

3. A method according to claim 1, wherein the step of resolving subsection conflicts comprises the steps of:

receiving memory references generated by said plurality of ports of said each processor;

tracking each subsection of said memory and generating subsection busy signals indicative of whether said each subsection is busy;

detecting if said memory references generated by said plurality of ports of said each processor are directed to subsections which are currently busy as indicated by said subsection busy signals;

allowing one of said memory references generated by one of said plurality of ports of said each processor to access said one of said plurality of subsections if said one of said plurality of subsections is not busy as indicated by said subsection busy signals; and resubmitting said memory references if they are directed to subsections which are currently busy.

4. A method according to claim 3, wherein the step of resolving section conflicts comprises the steps of:

receiving memory references generated by said plurality of ports of said each processor and which are allowed to proceed to attempt access to said one of said plurality of subsections;

detecting whether two or more of said memory references generated by said plurality of ports of said each processor and allowed to proceed to attempt access to said one of said plurality of subsections are attempting to simultaneously access said one of said plurality of sections;

allowing only one of said two or more memory references to access said one of said plurality of sections, said one of said two or more memory references being the one generated by one of said plurality of ports of said each processor which has an access priority greater than the other ports; and resubmitting the memory references not allowed access to said one of said plurality of sections.

5. A method according to claim 1, wherein the step of resolving bank conflicts comprises the steps of:

receiving said particular memory references;

tracking said plurality of banks of said one of said plurality of subsections and generating bank busy signals indicative of whether said banks of said one of said plurality of subsections are busy;

detecting if said particular memory references are attempting to access banks which are currently busy as indicated by said bank busy signals;

holding said particular memory references attempting access to banks which are currently busy and resubmitting said particular memory references; and allowing said particular memory references to access said banks if said banks ar not busy as indicated by said bank busy signals.

6. A method according to claim 5, wherein said resolving bank conflicts step further comprises the steps of:

detecting whether two or more of said particular memory references are attempting to simultaneously access said particular bank;

allowing only one of said two or more particular memory references to access said particular bank, said one of said two or more memory references being the one generated by one of said plurality of processors which has an access priority greater than the other processors; and resubmitting the memory references not allowed access to said particular bank.

7. A method according to claim 6, wherein said resolving bank conflicts step further comprises the steps of:

generating subsection release signals for said particular memory references allowed access to said one of said plurality of subsections in said one of said plurality of sections indicating that said memory references are allowed to access said individual addressable memory locations of said banks.

8. A method according to claim 1 further comprising the step of:

determining when a previous one of said particular memory references has completed accessing said particular bank so that said one of said particular memory references may access said particular bank.

9. A method according to claim 8, wherein said determining step comprises the steps of:

delaying said one of said particular memory references until a time when a subsection release signal would be received from said one of said plurality of subsections if no bank conflict occurs and access to said individually addressable memory locations is allowed and producing in response thereto a delayed particular memory reference;

receiving said subsection release signal and said delayed particular memory reference;

holding said subsection release signal as a pending subsection release signal while said one of said particular memory references is being delayed;

comparing said delayed particular memory reference with said subsection release signal and said pending subsection release signal; and clearing a subsection busy signal in response to a match between said subsection release signal or said pending subsection release signal and said delayed particular memory references indicating that said one of said particular memory references is allowed access to said particular bank.

10. A method according to claim 9, wherein said determining step further comprises the steps of:

receiving said delayed particular memory reference from at least one write port of said plurality of ports as a write memory reference;

comparing said subsection release signal and pending subsection release signal to said write memory reference; and clearing a subsection busy signal when said release subsection signal or the release subsection pending signal matches said write memory reference indicating that said write memory reference is allowed to access said particular bank in said one of said plurality of subsections.

11. A method according to claim 9, wherein said determining step further comprises the steps of:

receiving said delayed particular memory reference from at least one read port of said plurality of ports as a read memory reference;

comparing said read memory reference with said subsection release signal and said pending subsection release signal;

generating a conflict signal if there is no match between said subsection release signal or said pending subsection release signal and said read memory reference; and holding all other read memory references being delayed in response to said conflict signal and shutting down said at least one read port from generating any additional read memory references until any held read memory references are allowed access to a particular subsection to which they are attempting access.

12. A method according to claim 11, further comprising the step of:

controlling transfer of data from the memory to said each processor when memory references generated by said each processor are allowed access to a particular bank.

* * * * *